United States Patent Office
3,431,630
Patented Mar. 11, 1969

3,431,630
METHOD OF FIXING PIPE BASE IN
MULTILAYER CONTAINER
Hideo Sagara and Yasuhiro Iwasaki, Hiroshima-shi, Tsutomu Ohe, Hiroshima-ken, and Tomoyuki Mashimo, Hiroshima-shi, Japan, assignors to Mitsubishi Jukogyo Kabushiki Kaisha, Tokyo, Japan
Filed Dec. 8, 1964, Ser. No. 416,741
U.S. Cl. 29—480                      5 Claims
Int. Cl. B23k 9/02, 35/34

ABSTRACT OF THE DISCLOSURE

A process of attaching a pipe base to a multilayer container for use in a reaction apparatus for high pressure gas is comprised of the steps of forming a hole through the layers of the multilayer container, inserting the pipe base into the hole in the container and fusion welding the pipe base to all of the layers of the container employing a welding electrode of a softer material than the material used in forming both the pipe and the multilayers of the container. In forming the weld between the container and the pipe a weld deposit is formed on all the layers of the container having a beveled appearance in cross section, a similar weld is disposed on the end of the pipe base to be secured into the container, and the weld deposits on each are secured together by another weld deposit for securely attaching the pipe base to the container. Another step of the process comprises heating the inner circumference of the pipe base attached to the container for heat treatment of the welded attachment. Alternatively, the end of the pipe base may be expanded into the hole after the welded deposit has been formed.

Figure 1:
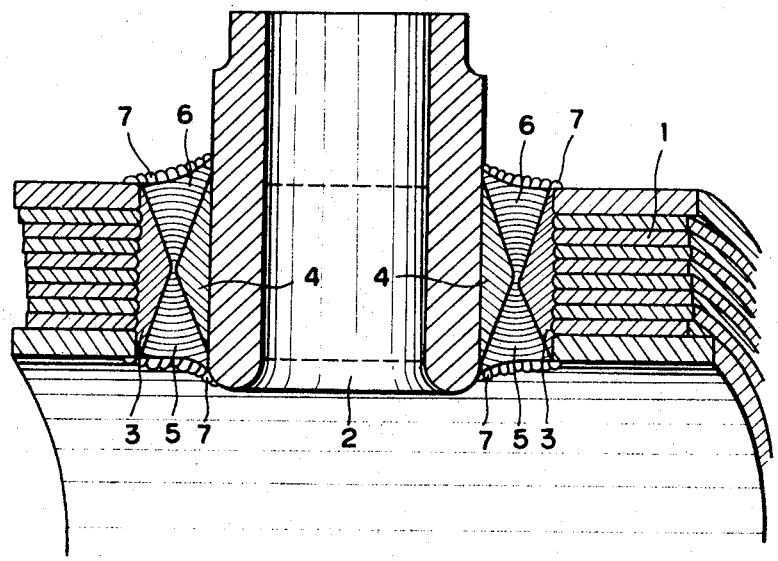

In another arrangement for forming the hole in the container, after the hole is formed through all the layers, a weld metal of a softer material than the material forming the layers of the container is deposited on the layers and then an outward force is exerted against the inner surface of the container for forcing the surface of the container around the hole outwardly.

This invention relates to improvements in a method of inserting a pipe base in a hole formed in the body of a multilayer cylinder to be used in a reaction apparatus for high pressure gas and attaching it thereto by fusion welding.

Since a multilayer container is more resistant to destruction when its internal pressure rises to an abnormal degree, it is considerably safer in use than a thick single-layer container of the same material and measurement throughout. Moreover, it is possible to make multilayer containers of large diameters without depending upon the size of a steel ingot as a raw material and upon the capacity of a forging machine for forming the container and therefore, there is a growing tendency for such containers to be used very frequently in future. However, in the case of attaching a pipe base to the cylindrical body, it is impossible to reinforce it by applying a plate around a hole formed therein since both external and internal cylinders are made of a thin plate. Under such circumstances, it is considered generally better to increase the external diameter of the pipe base for enlarging its cross section and to insert it in the body and weld it elaborately so that the periphery of the hole formed therein can be reinforced. It has been generally realized that heat-treatment for stress-relieving after welding the pipe base is unnecessary as it is welded to each layer of a thin plate one by one in turn and, moreover, such heat-treatment after welding the pipe base may be rather detrimental to close tightening of the layers of such multilayer container, thus giving rise to an inconvenient factor in operation.

However, the present applicants carried out destruction tests on containers in their research of strength of the fixed portion of a pipe base in a multilayer container according to another invention made by them. They found that the diameter of the container expanded uniformly throughout the body but such expansion was delayed near the attached portion of such pipe base until it became concave to show permanent set and there occurred annular fissures around the periphery of the attached portion of the pipe base in the internal cylinder of the body before its destruction.

As explained above, the container supplied for destruction tests to multilayer containers was manufactured in accordance with the invention disclosed in the U.S. Patent No. 3,163,183 and there was no longitudinal butt welding between the layers so that along with increasing internal pressure the whole body reached its yield point and expanded uniformly, whereas the layers around the periphery of the attached portion of the pipe base were hardened by welding and their elongation became less and at the same time, such layers were delayed in expansion because their deformity became difficult under control by the pipe base of a high yield point and/or the welded metal, and the body became concave and deformed only around the periphery of the attached portion of the pipe base. So far as containers of this shape are concerned, larger stress is considered being applied to the periphery of the attached portion of the pipe base than other portions from the piewpoint of the strength of the materials.

On the other hand, it is probable that the concave portion on the periphery of the fixed portion of the pipe base will be formed before applying internal pressure to the container, at the time of attaching the pipe base by fusion welding to the body, due to the heat-contraction of the welded metal.

The characteristics of a multilayer container are such that when internal pressure is applied, useful prestress being exerted the stress of the layers may not rise to an excessive degree. However, when forming a hole for insertion of a pipe base into the body, the layers at the periphery of the hole will lose all prestress and especially, the layers are given residual tensile stress contrariwise because of their heat contraction at the time of welding with the pipe base and, moreover, close adhesion between the layers becomes worsened until the characteristics of high destruction resistance of the multilayer container are lost so that said portion may be damaged first whereas the other portions are still sufficiently sound. In contrast, a single-layer container of a large thickness lacks toughness and in the case of a large container of the same size as that of a multilayer one, the former is considered to have only 70–80% of the strength of the latter, but after attaching the pipe base, the whole body is heated treated so that stress can be relieved and, therefore, no local destruction will occur at this portion which must be well observed.

Because the container experimented on by the present applicants was manufactured in accordance with the above-mentioned U.S. patent, its body was extremely resistant to destruction. Consequently stress was apt to be concentrated around the periphery of the attached location and local destruction at this portion took place at the early stages in an especially apparent manner. However, as for multilayer containers in general use, i.e. those in which concentrically welded circles are overlapped with the distribution of a plurality of longitudinal butt welds slightly different from each other, the same results would develop if destruction tests were run on such containers similarly equipped with the arrangement of such pipe base. In order to solve these problems, the present invention recommends that when inserting a pipe base in a hole formed in the body of a multilayer container, and attaching it to all the layers of the body by fusion welding, a welding metal is used which is softer than the metal of the body (softer means being softer than the material of the body) and residual stress due to welding is relieved by local heat-treatment, or the portion and its periphery is locally heat-treated by heating the inner surface of the pipe base, and the bore of the pipe base is extended by means of a roller or some similar means, or the periphery of the attached portion of the pipe base is pushed outward to make a convex shape. If the welding metal is softer and heat treated, when the multi-layer container is subjected to excessive internal pressure until its body yields to expansion, the welded portion of the pipe base also yields to prevent the concentration of stress destruction of the portion.

In this case, if a portion of the body and pipe base for welding purposes is cylindrical and provided with a relief portion of a soft metal, the layer of soft welding metal becomes sufficiently thick so as to provide a better effect on prevention of concentration of stress.

If heating for the heat-treatment is started from the internal circumference of the pipe base, it is possible to heat-treat the periphery of the attached portion of the pipe base without overheating the inner and outer layers. When the attached portion of the pipe base is expanded from its inner circumference by a roller or similar means useful prestresses will be given so that the absolute value of stress arising at the time of loading internal pressure on the container can be lowered thus eliminating damages which might otherwise be incurred.

Moreover, after making a hole for insertion of a pipe base into the body of a multilayer container, an annular band of contact metal is applied to the hole and when the annular band of contact metal is pressurized outwardly, the periphery of the hole can be pushed out by comparatively weak force so as to become convex because the layers are liable to slide with each other whereby they can adhere thereto satisfactorily and is given useful prestress after the time of inserting the pipe base therein and welding it when internal pressure is given to the container, the stress loaded on the periphery of the attached portion of the pipe base does not rise excessively due to the fact that said portion has been given a convex shape and useful prestress. In order to push out the periphery of the hole in the body for insertion of the pipe base, it can be pushed outwardly by means of a jack or it may be drawn out from the outer side thereof or by an explosive molding method. If the force of a jack is weak the inner circumference of said hole may be heated, whereby it becomes easy to bend due to the softening of the material and internal stress arising from heat expansion. When the inner circumference of the hole is provided with a relief portion of a soft material, it is possible to prevent overheating and oxidizing the layers even if heating has occurred in flames.

In case either the above-mentioned process alone is carried out or in combination with some other method to attach a pipe base to a multilayer container, such containers are much safer in use than welded ones composed of a single-layer thick plate or forged ones of a single-layer of a large thickness, conventional in the art, and moreover, even safer than multi-layer containers in which a pipe base is attached by an already known method and which have been regarded as safe hitherto.

With reference to the accompanying drawings, the invention will be explained in detail.

Figure 2:
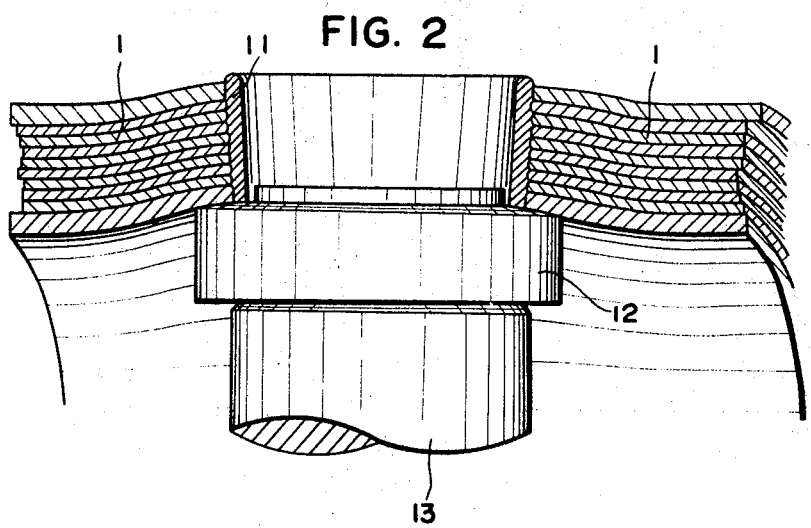

FIG. 1 shows the arrangement of a steel pipe base attached to the body of a steel multilayer container by fusion welding to be used in a reaction apparatus for high pressure gas, in accordance with one method of the present invention and FIG. 2 is an explanatory view of another method according to the present invention for forming an insertion hole for the pipe base shown in FIG. 1.

In FIG. 1 there is formed a cylindrical hole for attaching a pipe base 2 to a body 1 and the layers surrounding the periphery of said hole are welded together with an electrode of a softer material, a beveled portion 3 is formed by means of a relief metal and it is heated from the inner circumference thereof so that internal stress of the layer material and beveled portion 3 can be relieved and then softened. Simultaneously, a relief portion is provided around the outer circumference of the pipe base 2 and a beveled portion 4 formed therein. After performing local annealing, the pipe base is inserted in the opening in the body 1 and is joined by fusion welding with weld deposits 5 and 6 placed between the opposed beveled portions 3 and 4, and a surplus relief portion 7 is also formed, which is subsequently removed.

This formation does not give rise to excessive stress at the fixed portion of the pipe base when internal pressure is exerted within the container. Further, when the inner circumference of the pipe base 2 is heated by flames or an electric heater, the weld deposited metals 3, 4, 5, 6 can also be heat treated. When the periphery of the attached portion of the pipe base has been prestressed by expanding the inner circumference by means of a roller or similar means, there occurs no excessive stress around the periphery of the attached portion of the pipe base 2 even under internal pressure is exerted within the container. This procedure also serves to eliminate the remaining harmful stress due to the fusion welding and the local heat-treatment and it is effective in imparting preliminary useful prestress thereto.

FIG. 2 shows one shape of the periphery of a hole for insertion of the pipe base 2 into the body 1, said periphery being pushed upwardly. This shape is obtained by firstly making a circular hole in the body 1 as shown in FIG. 1, relieving a welded material in the periphery of said hole to provide a layer 11 of a soft material and an annular band of contact metal 12 is applied thereto from inside the body so that said periphery can be pushed upwardly by means of a push-up jack 13 to provide such formation as shown in FIG. 2.

The relief layer 11 is heated by flames from the inner circumference thereof to soften the layers and yield internal compressive stress whereby the operation can be carried out with only a little push-up force. However, according to the characteristics of a multilayer body, sliding movement occurs between the layers so that less push-up force is sufficient than that of one of a single thickness, and moreover, the layers adhere to themselves very closely so that the layers can be given useful prestress and when internal pressure is exerted within the container after attaching the pipe base 2 thereto, there occurs no excessive stress around the periphery of the attached portion of the pipe base.

When this push-out operation is to be performed after attaching the pipe base, this may be heated starting from the inner circumference whereby the operation can be performed without increasing the force of a push-up jack 13. It is also possible to assure more safety than otherwise by applying a roller effect on the inner circumference of the pipe base to give useful prestress to the pipe base and its periphery after the abovementioned operation.

Substantially, this invention embodies a very useful process of attaching a pipe base in a multilayer container by fusion welding wherein the material around the periphery of fixed portion of the pipe base and the multilayers of the body are softened and heat treated, useful prestress being exerted to produce a convex shape. When internal pressure is exerted upon the container, the stress which is exerted on the attached portion of the pipe base can be distributed among the outer areas to prevent the concentration of said stress on the periphery of the attached portion of the pipe base and also to protect said periphery from local destruction.

What is claimed is:

1. A process of attaching a pipe base to a multilayer container for use in a reaction apparatus for high pressure gas, comprising the steps of forming a hole through all the layers of the multilayer container, depositing a layer of weld material within the hole formed through the container with the weld material being applied to each of the layers of the container forming the hole and the weld material being of a softer material than the material forming the layers of the container, inserting the pipe base into the hole formed in the container affording an annular space between the pipe base and the layer of weld material on the hole within the container, fusion welding the pipe base to the layer of weld material for its entire length within the hole through the container.

2. A process as set forth in claim 1, comprising the step of heating the inner circumference of the pipe base attached to the container for heat treating the pipe and the container at the welded connection.

3. A process as set forth in claim 1, comprising the step of expanding the portion of the pipe base secured by welding to the container.

4. A process as set forth in claim 1, comprising shaping the layer of weld material deposited on the multilayers of the container for forming beveled surfaces sloping inwardly into the hole from the outer and inner sides of the container to a ridge located intermediate the inner and outer sides of the container, depositing a layer of welding material on the outer surfaces of the pipe base extending for at least the length of the pipe base to be inserted within the hole in the container, and shaping the layer of deposited weld material for forming beveled surfaces arranged to slope from the opposite ends of the layer on the pipe base inwardly toward the juxtaposed surface of the container to a ridge intermediate the opposite ends of the layer, and fusion welding the beveled layers of weld material on the pipe base and the container.

5. A process of attaching a pipe base to a multilayer container for use in a reaction apparatus for higher pressure gas comprising the steps of forming a hole through all of the layers forming the container, depositing a layer of weld material within the hole on all of the layers of the container with the weld material being softer than the material forming the layers of the container, exerting an outwardly directed force against the inner surface of the container at the location of the hole therethrough for forcing the surface of the container about the hole in an outward direction, and inserting a pipe base into the outwardly forced hole in the container, and fusion welding the pipe base to the weld layer deposited on the container within the hole therethrough.

References Cited
UNITED STATES PATENTS

| | | | |
|---|---|---|---|
| 2,192,904 | 3/1940 | Ferris | 29—482 |
| 3,334,395 | 8/1967 | Cook et al. | 156—293 |
| 2,678,224 | 5/1954 | Kooistra | 29—157.4 X |
| 2,785,459 | 3/1957 | Carpenter | 29—492 X |
| 3,015,508 | 1/1962 | Kunz | 29—484 X |
| 3,078,551 | 2/1963 | Patriarca et al. | 29—157.4 |
| 3,120,400 | 2/1964 | Carpenter | 29—157.4 X |
| 1,078,906 | 11/1913 | Eldred | 29—473.5 |
| 2,779,998 | 2/1957 | Bailey | 29—470.3 |
| 2,795,039 | 6/1957 | Hutchins | 29—470.3 |
| 2,819,001 | 1/1958 | Pottle | 156—293 X |
| 3,144,710 | 8/1964 | Hollander et al. | 29—470.3 |
| 3,240,644 | 3/1966 | Wolff | 156—165 |

HAROLD ANSHER, *Primary Examiner.*

U.S. Cl. X.R.
29—482, 492, 497, 499; 156—165, 293, 311, 322